United States Patent
Dinan et al.

(10) Patent No.: US 7,925,703 B2
(45) Date of Patent: Apr. 12, 2011

(54) GRAPHICAL INTERACTIVE INTERFACE FOR IMMERSIVE ONLINE COMMUNITIES

(75) Inventors: Mark Andrew Dinan, Pasadena, CA (US); Jennifer Yun-Man Sun, Santa Monica, CA (US); Ann M. Pickard, South Pasadena, CA (US); James Mason Bower, Boerne, TX (US)

(73) Assignee: Numedeon, Inc., Pasadena, CA (US)

( * ) Notice: Subject to any disclaimer, the term of this patent is extended or adjusted under 35 U.S.C. 154(b) by 1463 days.

(21) Appl. No.: 10/022,795

(22) Filed: Dec. 20, 2001

(65) Prior Publication Data

US 2002/0097267 A1 Jul. 25, 2002

Related U.S. Application Data

(60) Provisional application No. 60/257,299, filed on Dec. 26, 2000.

(51) Int. Cl.
*G06F 15/16* (2006.01)
*G06F 15/173* (2006.01)

(52) U.S. Cl. ......................... 709/206; 709/223

(58) Field of Classification Search .................. 709/227, 709/203, 217, 206, 223; 455/558; 702/182; 715/500.1

See application file for complete search history.

(56) References Cited

U.S. PATENT DOCUMENTS

| | | | |
|---|---|---|---|
| 5,802,296 A * | 9/1998 | Morse et al. .................. 709/208 |
| 5,832,212 A | 11/1998 | Cragun et al. |
| 5,864,342 A | 1/1999 | Kajiya et al. |
| 5,880,731 A | 3/1999 | Liles et al. |
| 5,884,029 A | 3/1999 | Brush, II et al. |
| 5,884,033 A | 3/1999 | Duvall et al. |
| 5,911,043 A | 6/1999 | Duffy et al. |
| 5,926,179 A * | 7/1999 | Matsuda et al. .............. 715/752 |
| 5,973,683 A | 10/1999 | Cragun et al. |
| 6,020,885 A * | 2/2000 | Honda .......................... 715/757 |
| 6,076,100 A | 6/2000 | Cottrille et al. |
| 6,091,410 A * | 7/2000 | Lection et al. ................ 715/706 |
| 6,154,211 A * | 11/2000 | Kamachi et al. .............. 345/419 |
| 6,175,857 B1 * | 1/2001 | Hachiya et al. ............... 709/206 |
| 6,181,343 B1 * | 1/2001 | Lyons ........................... 715/850 |
| 6,233,618 B1 | 5/2001 | Shannon |
| 6,268,872 B1 | 7/2001 | Matsuda et al. |
| 6,285,380 B1 | 9/2001 | Perlin et al. |
| 6,336,133 B1 | 1/2002 | Morris et al. |
| 6,339,784 B1 | 1/2002 | Morris et al. |
| 6,349,301 B1 * | 2/2002 | Mitchell et al. ............... 707/101 |
| 6,397,080 B1 * | 5/2002 | Viktorsson et al. ........... 455/558 |
| 6,424,995 B1 | 7/2002 | Shuman |
| 6,438,632 B1 | 8/2002 | Kikugawa |
| 6,446,119 B1 | 9/2002 | Olah et al. |
| 6,466,917 B1 | 10/2002 | Goyal et al. |
| 6,523,037 B1 | 2/2003 | Monahan et al. |
| 6,633,855 B1 | 10/2003 | Auvenshine |

(Continued)

*Primary Examiner* — Hussein A Elchanti

(74) *Attorney, Agent, or Firm* — Michael A. Kerr; Kerr IP Group, LLC

(57) ABSTRACT

The present invention discloses a computer system within a computer network having multiple computers connected together using telecommunications mechanisms for graphically interacting within immersive online communities. A user selects a set of desired characteristics associated with a personality for creation of a first intelligent virtual object. The first intelligent virtual object interacts with other intelligent virtual objects within the immersive online community utilizing predetermined interface tools such that said other intelligent virtual objects receive real-time responses to stimuli initiated by said other intelligent virtual objects. The first intelligent virtual object interactively passes user generated content between said other intelligent virtual objects and said user under administrative controls.

17 Claims, 15 Drawing Sheets

U.S. PATENT DOCUMENTS

| | | |
|---|---|---|
| 6,665,659 B1 | 12/2003 | Logan |
| 6,772,195 B1 * | 8/2004 | Hatlelid et al. ............... 709/204 |
| 6,823,363 B1 | 11/2004 | Noveck et al. |
| 6,954,906 B1 * | 10/2005 | Kamachi et al. .............. 715/799 |
| 6,978,292 B1 * | 12/2005 | Murakami et al. ............ 709/204 |
| 7,033,275 B1 * | 4/2006 | Endo et al. ...................... 463/33 |
| 7,065,553 B1 * | 6/2006 | Chesley et al. ............... 709/205 |
| 7,140,045 B2 * | 11/2006 | Gudorf et al. ................... 726/28 |
| 2002/0142842 A1 | 10/2002 | Easley et al. |
| 2002/0147782 A1 | 10/2002 | Dimitrova |
| 2004/0088369 A1 | 5/2004 | Yeager et al. |
| 2005/0086300 A1 | 4/2005 | Yeager et al. |

\* cited by examiner

Fig. 6
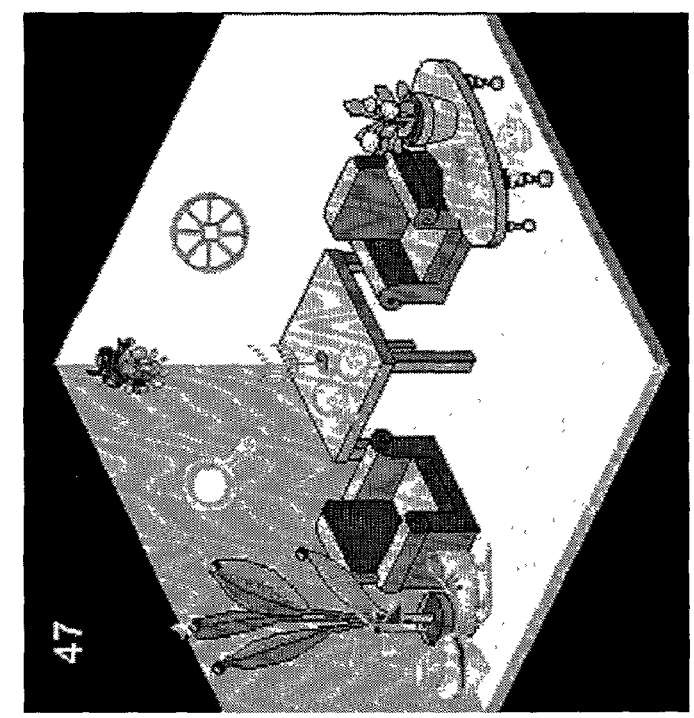
B
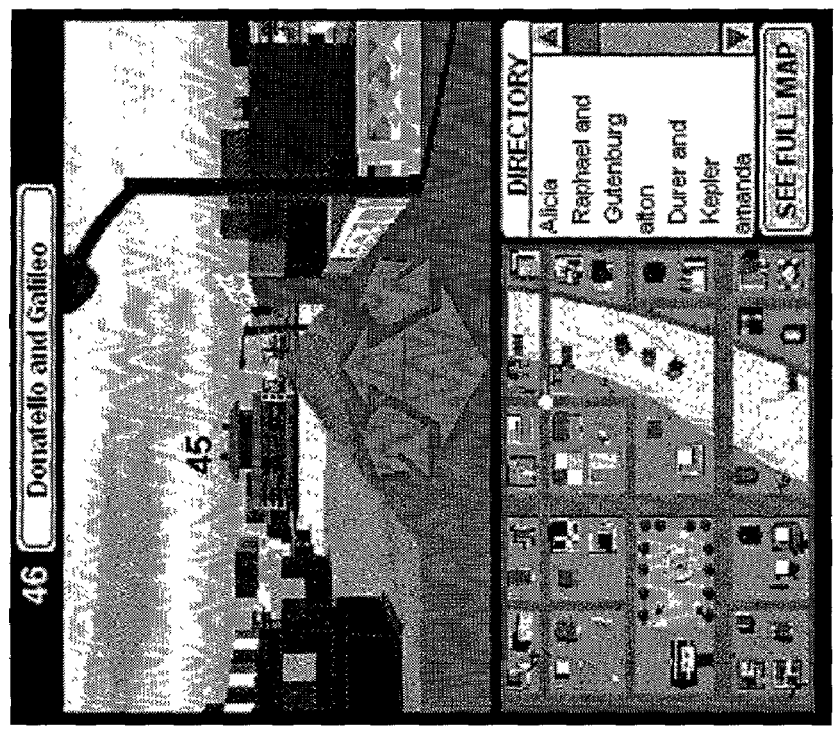
A

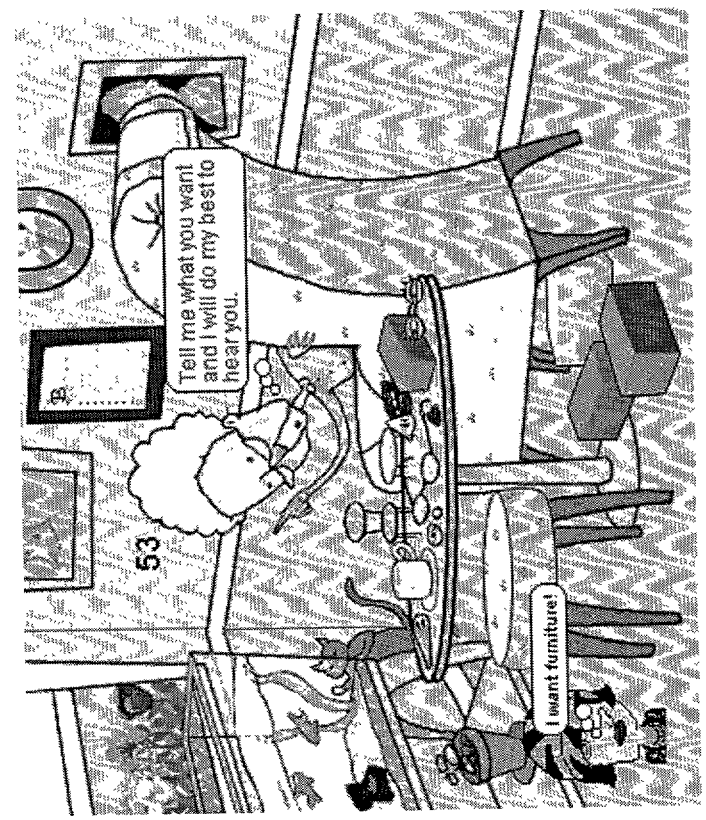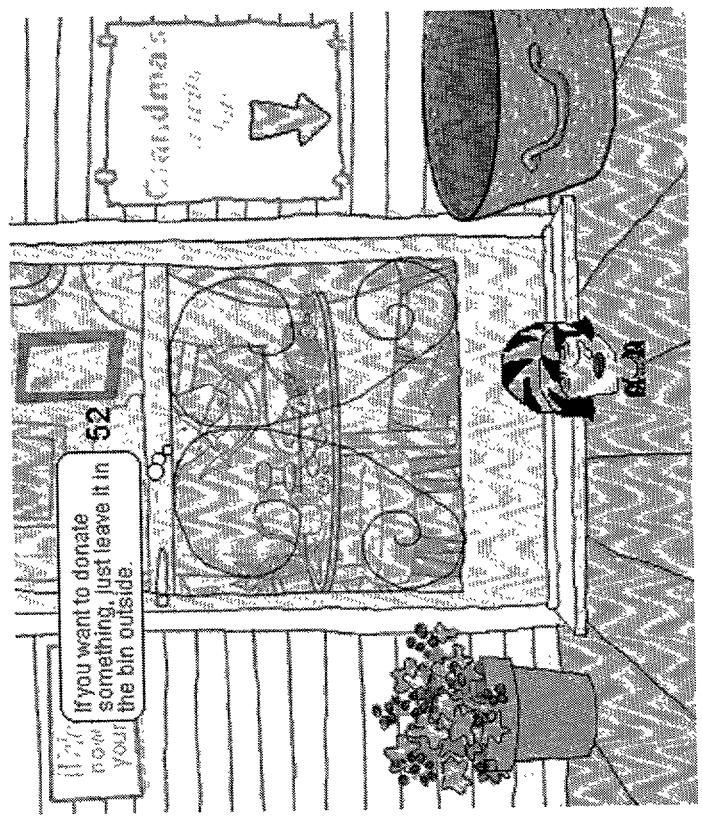
Fig. 8

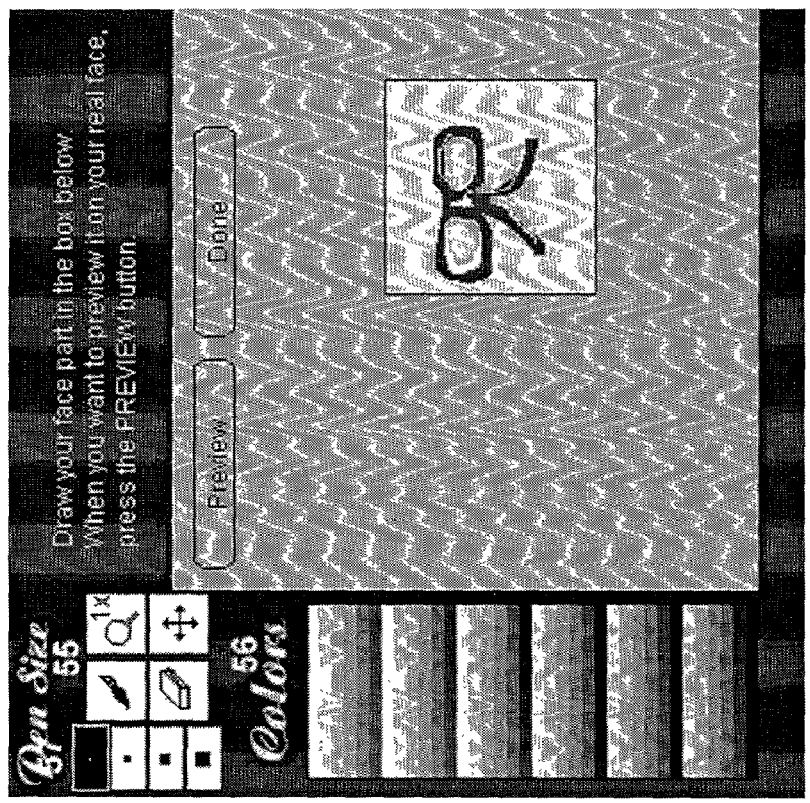
Fig. 9

A  Chat Filtering  65

If you want to block hearing offensive words in chat, turn on the filtering list below. Also, if there are more words you don't want to hear or words you don't want to say, add them to the lists below. You might want to add your home address or phone number to the list you don't want to say, so that you're sure you don't give out any dangerous information in chat.

☐ Do not filter my chat for offensive words using the City Hall standard filtering list.

Other words I don't want to hear:    Other words I don't want to say:

B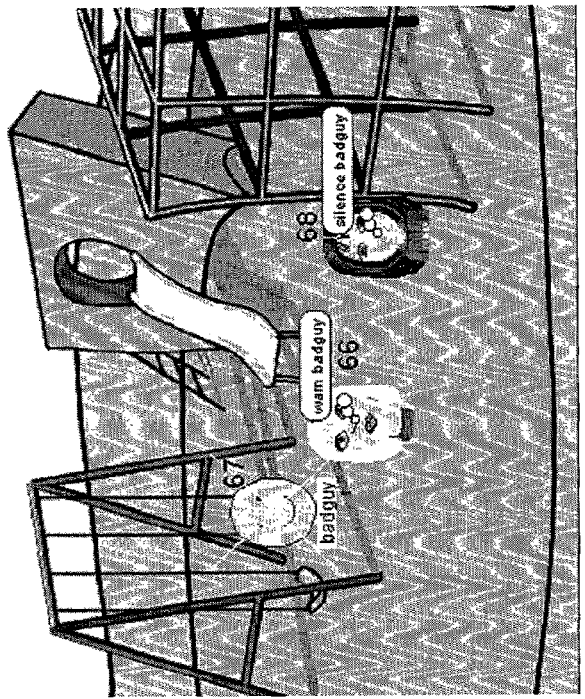

Fig. 12

70
- 88qtpie88 [Fri Dec 15 06:11:23 2000] (leilaPatio) : bitch
  Comments:

Mute for [    ] days. Fine [    ] clams. ○ Banish. Rap Sheet
  - koolchic : warn 88qtpie88
  - koolchic :
  - smarties1 :
  - koolchic : Hunter07:13
  - casey23 : know you werent you just came right on top of me!
  - casey23 : i was here
  - koolchic : WOOOOWAAAAAAAAAA
  - Hunter07 : koolchic:then why do you have real kids
  - casey23 : thank you
  - koolchic : Hunter07:not real one your moron@
  - 88qtpie88 : warn casey13
  - smarties1 : koolchic:omg...quit crying..it wasnt gonna last anyways!
  - 88qtpie88 : warn casey23
  - Leanne : hi everone!
  - 88qtpie88 : bitch]

- TheBigP [Fri Dec 15 06:18:26 2000] (leilaPatio) :girliechannybrittsmomisreallyga
  Comments:

Mute for [    ] days. Fine [    ] clams. ○ Banish. Rap Sheet
  - sweetie02 : mmmmm

A

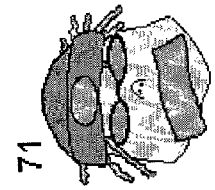

| Edit | Select | Valid | For Sale | quantity | Price | Description | image |
|---|---|---|---|---|---|---|---|
| Edit | ☐ | Yes | Yes | 858 | 120 | Blue Couch | |
| Edit | ☐ | Yes | Yes | 588 | 30 | BIG Plant | |
| Edit | ☐ | Yes | Yes | 928 | 35 | Brown Table | |
| Edit | ☐ | Yes | Yes | 887 | 35 | Blue Table | |

85

Delete selected records
Select All
UnSelect All

GRAPHICAL INTERACTIVE INTERFACE FOR IMMERSIVE ONLINE COMMUNITIES

This application claims priority from Provisional U.S. Patent Application Ser. No. 60/257,299, filed Dec. 26, 2000, the teachings of which are hereby incorporated by reference in their entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to a system and methods for supporting interactive communities within a graphical virtual reality on the Internet.

BACKGROUND OF THE INVENTION

Virtual reality (VR) as a concept has been around for a long time. Implementations of VR on the Internet have come and gone, notably in 1997 when the VRML (Virtual Reality Mark-up Language) standard gained momentum. Literally hundreds of virtual worlds, another moniker for VR, existed at that time. The problem was that VRML required special client software, had problems in implementation especially with regards to shared objects, and fell into disuse when corporations such as Silicon Graphics later pulled their full support from the standard. As a result, VRML has not become a default browser capability and relatively few sites today use VRML to provide VR. The challenge of creating a successful virtual reality experience on the Internet lies in implementing a VR interface that is accessible via readily available tools, intuitively understood so that the virtual experience is immediate and compelling, and experientially immersive so that the user can become deeply involved.

Current VRs on the Internet can be categorized into three types. One is text based, a second is graphical but requires special client software, and the third is graphical and only requires a standard Internet browser.

The text-based VRs are called MUDs and MOOs. These terms stand for Multi-User Domains and Object-Oriented MUDs, respectively. Text-based worlds allow people to form a persona, own virtual property, interact with each other and objects, and make creative contributions. They are limited to text, however, and depend upon cryptic command-line instructions. Also, the streaming text chat limits meaningful discussions to eight or less people and at most two conversations; otherwise the streaming chat becomes too difficult to follow. Users must be conversant with systems running UNIX, Telnet access to special server ports, command prompt instructions, and basic programming in order to interact and make creative contributions to these worlds. Taken together, these barriers result in a steep learning curve, and thus most MUDs are for 18 to 35 year-old, technically savvy people.

The second type of VR is graphical but requires special client software. There are a number of examples in this area. www.communities.com, formerly known as the Palace, uses a proprietary software to set-up virtual worlds. This is being used to serve up a great number of virtual worlds, but all require special client downloads. Such proprietary plug-ins often take upwards of thirty minutes to download on a modem. Similar sites are www.liveworlds.com, www.worlds.net, www.cybertown.com, and www.ntts.com/ispace.html. The proprietary client software has prevented them, however, from reaching large-scale use. These virtual worlds are again primarily suited for technically savvy people who are willing to download and install the software, spend time using their sophisticated but definitely not simple interface to build their persona and establish themselves in this virtual world. There are no existing sites of this type targeting uninitiated audiences, such as young children.

The third type of VR sites consists of ones that use a Java, modified Java/VRML client, or Flash, a multimedia client to access a shared-object virtual space. These sites require little or no extra client software because both Java and Flash is bundled with most current browsers. The system described in the present invention supports VR sites belonging to this category. Other key examples within this category are www-.blaxxun.com and www.minds.com. The Blaxxun site claims not to require a download, although its flagship VR community CyberTown, as mentioned above, recommends that the user download and install additional software to fully experience its 3-D environment. Without this download, one can still participate in the VR world and community, but so much of the user's online experience is bound to 2-D flat pages that the sense of immersion is compromised. Minds.com, on the other hand, truly does not require any download. Users log onto communities inside minds.com to chat with others who share their interests. However, the only activities are chatting and messaging. While it is a community, minds.com does not qualify as a VR and is clearly not an immersive 3-D world. Flash is enjoying increasing popularity in the multimedia world. While it is not yet extensively used for supporting VR communities, it is likely to become more common. While this plug-in comes bundled with most current browsers, whenever an upgrade is required, a substantial download and upgrade time is necessary.

In sum, among the VR communities that exist on the Internet today, there is a serious trade-off between immersion (e.g., graphical 3-D environment, rich multi-user interaction) and ease of use (e.g., no extra downloads or installs, intuitive graphical interface). It is therefore desirable for the state of the art in Internet communities to have a system that is not limited in this way, a system that maximizes immersion without compromising ease of use.

SUMMARY OF THE INVENTION

Accordingly, the present invention is directed to graphical interactive interface for immersive online communities that substantially obviate one or more of the problems due to limitations and disadvantages of the related art.

An object of the present invention is to provide a system that can support a completely graphical, 3-D, interactive VR community without sacrificing ease of use. In particular, the invented system uses pure Java, with no additional plug-ins or installations necessary, to provide interfaces and tools that are graphical and intuitive to uninitiated users as young as the age of 8. Only the most basic PC equipped with 32K RAM, a 48K modem and any standard web browser such as Netscape v4.0 or greater is necessary.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a suite of interface tools for users to experience interactive communities within a graphical VR environment on the Internet. Users, represented by self-created avatars, move around in a third-person navigational scheme in a 2½-D representation of a 3-D world, interacting with other users in real time. They participate in and contribute to a fully immersive, virtual community using software tools that allow them to establish personal identities, interact with other users, create persistent objects, and participate in a virtual economy as well as the control and governance of the community.

In another aspect of the present invention there is provided a software architecture developed specifically to support such a VR experience. The general user interface in a given room (or area) of the virtual world is supported by an integrated chat server that is optimized for flexibility, so that modules for implementing additional behaviors can be added on as needed. In its most generic form, the server handles avatar movement, balloon notes for chat text, projectile throwing between avatars, and navigation by moving to on-screen hotspots.

The architecture integrates with any SQL-compliant database for persistent storage on the server side. This feature of persistence allows users to maintain identity and existence within community across visits and is crucial for conveying the sense of permanence necessary for the development of a community.

In yet another aspect of the present invention there is provided a client-side user interface which is heavily optimized for low bandwidth connections and is supported by a small multimedia applet conceived specifically for the present invention. The applet is a very small download, around 30 kilobytes. The client's browser caches this applet once and then uses it repeatedly for subsequent pages. This applet represents a run-time environment for a language invented for the needs of the present inventive system. This language is small, Tcl-like, and consists of about 80 commands that control aspects of the user interface. The minimal size of this client presents no barrier to even modem users, allowing for seamless entry into the VR environment. Whenever the client is upgraded, the upgrade process is again seamless and transparent, requiring no additional download or install time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A & 6B are two screen shots showing examples of personal spaces that can be designed and created by a user within a VR generated using this invention.

FIGS. 8A & 8B illustrate scenes depicting the invention's method of dispensing information and interacting with a user via automated characters that speak using chat bubbles.

FIGS. 9A & 9B show screen shots from the free-draw tool supported by this invention that allows users to create objects for persistent storage.

FIGS. 10A & 10B illustrate two screen shots showing the tool in this invention that enhances participation in the virtual economy.

FIG. 11A shows a screen shot of a control panel for user-controlled language filtering, and FIG. 11B shows a scene depicting the warn function and silence function used for peer censoring and self-governance among users.

FIGS. 12A & 12B shows a dialog box for administering community behavior control and an image of an avatar whose user has lost chatting privileges.

FIG. 15 illustrates a control panel for content administration supported by the present invention.

DETAILED DESCRIPTION OF THE PREFERRED EMBODIMENT

Reference will now be made in detail to the preferred embodiments of the present invention, examples of which are illustrated in the accompanying drawings.

Figure 1:
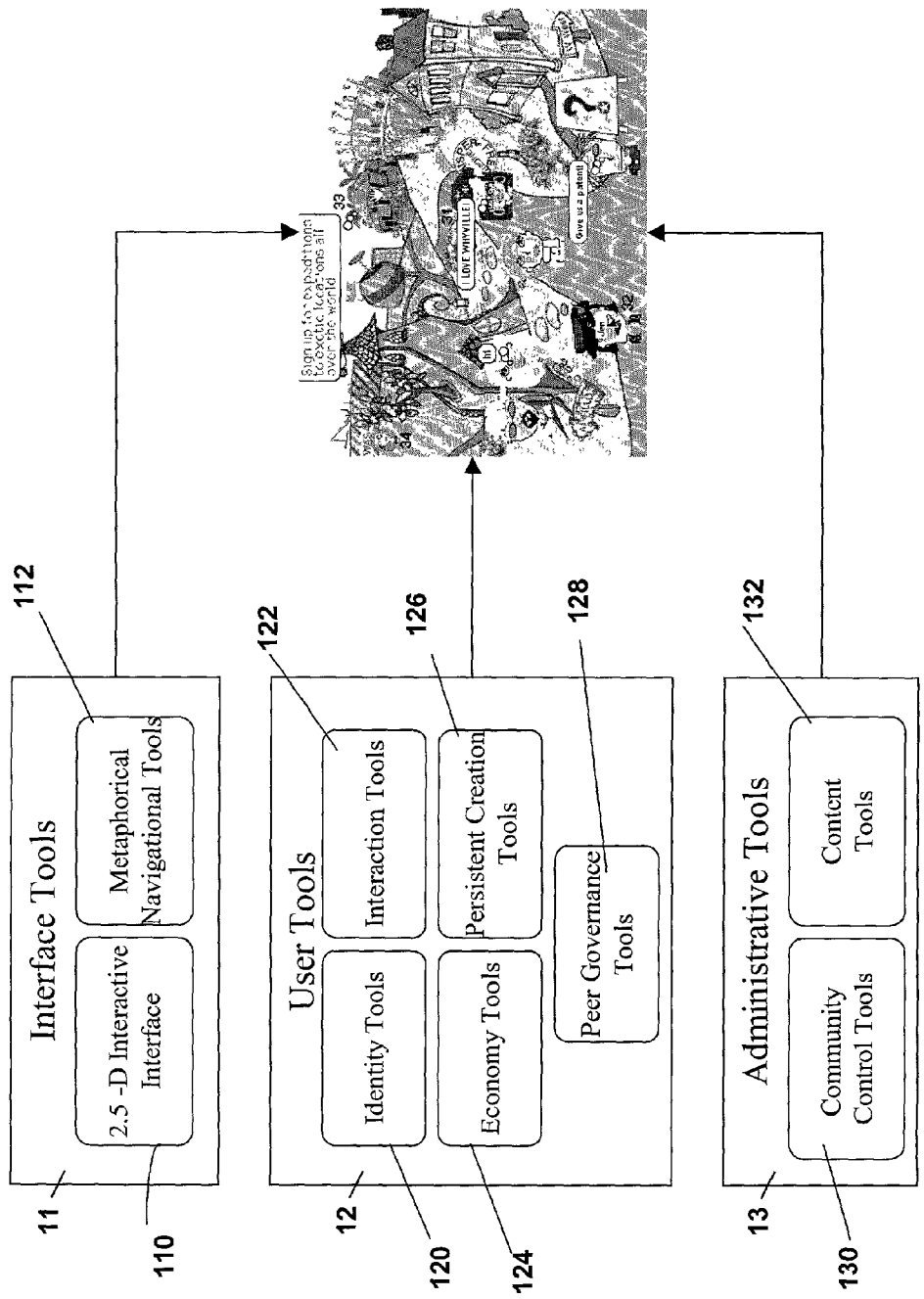
FIG. 1 is a diagram showing the categories of tools supplied by this invention for supporting and experiencing an interactive VR environment.

FIG. 1 shows a diagram categorizing the tools supported by this invention. The tools fall under three general categories: interface tools 11, user tools 12, and administrative tools 13. Interface tools 11 are tools used by the system to provide the immersive look and feel of the VR environment. Each scene within a VR environment generated by this invention is a graphical, 2.5-D interactive interface 110. This interface is generated by a system whose architecture is described in FIGS. 2 & 3. Another interface tool is metaphorical navigational tool 112. The user features of this interface are depicted in FIG. 4.

User tools 12 are tools controlled by a user within this VR environment, including identity tools 120, interaction tools 122, economy tools 124, persistent creation tools 126, and peer governance tools 128. Identity tools 120, described in FIGS. 5 & 6, allow users to create unique and persistent identities for themselves within a virtual community. Interaction tools 122, illustrated in FIGS. 7 & 8, allow users to interact both with system-generated characters as well as other users within the virtual community. Persistent creation tools 126, described in FIG. 9, allow users to generate content that exists persistently within the community. Economy tools 124, illustrated in FIG. 10, allow users to participate with the virtual economy supported by the system. Peer governance tools 128, described in FIG. 1, allow users to participate in setting community standards and maintaining community safety.

Administrative tools 13 are used by administrators of a VR community supported by this invention. They are described in FIGS. 12 and 15. Community administrators use the community control tools 130 to police the users of the site and the content tools 132 to manage the content of the site. The full implementation of these tools achieves a interactive, graphical VR community that supports an intuitive, immersive experience for users as young as 8 years of age.

Figure 2:
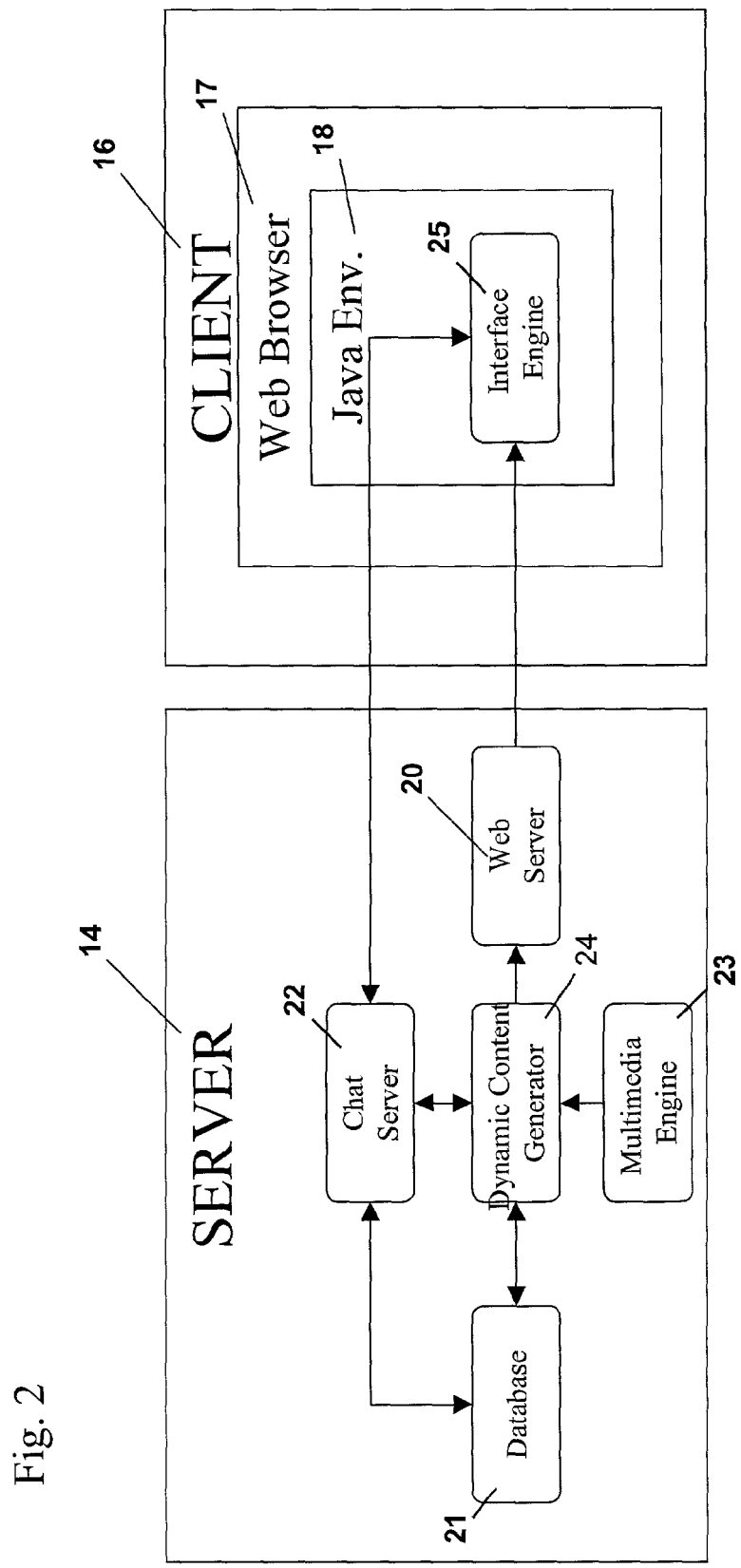
FIG. 2 is a flow chart showing the software architecture of this system.

FIG. 2 is a diagram that describes the software architecture of this system. The system includes components on the server side 14 and the client side 16. The server side components include a database 21, a chat server 22, a multimedia engine 23, a dynamic content generator 24, and a web server 20. The general interface of a given scene or room in this VR environment is defined by a interface engine 25 developed specifically for this invention and is described in more detail in FIG. 3. The chat server 22 combined with the dynamic content generator 24 is optimized for flexibility and handles user interactions in each scene or room according to the specifications of the multimedia engine 23. In its most generic form, it handles user interactions such as avatar movement, balloon notes for chat text, projectile throwing between avatars, and navigation by moving to on-screen hotspots. One can then add features to this base by subclassing the generic room to support, for example, multi-player games with persistent objects. The chat server also interfaces with the database 21. It also has port-forwarding capability, allowing this invention to be firewall-friendly.

Each scene, room, tool, and function in this VR environment relies upon dynamically generated content 24 that is served to the client browser by the web server. The dynamic content input from and output to the database 21, which provides persistent storage of user identification, specifications, and creations. All modules have access to a set of common core tools, such as user authentication and economic transaction handling. The extensive interface between the backend database with the other server-side components allow each scene and tool in this VR environment to be highly customized and personalized for the user.

The dynamically generated content encapsulates user interface, user interaction specifications, and user tools represents the final output to the client. The client-side 16 user interface engine 25, developed specifically for this invention, is a Java applet within a Java Environment 18 that sits within the web browser 17 of the client. The applet is a very small download, around 30 kilobytes, and optimized for low-bandwidth connections. The client's browser caches this applet once and then uses it repeatedly for subsequent pages.

The small size of the interface engine 25 is achieved by leveraging the many megabytes of Java standard class libraries that come pre-installed with any Java-enabled browser. The user interface of this invention relies upon a very thin, opcode-based language which minimizes download time. The applet that is cached in the client-side browser acts as a small and efficient interpreter in Java for this language.

The same user interface functionalities could be achieved with straight Java, rather than this specifically designed opcode-based language. However, each room or scene of a VR environment created in this manner would have required a separate applet download and there would be no efficiency gained by infrastructure sharing. Moreover, Java as a language was written for extensibility, expandability, and security, with no attention paid to asset size. Instead, the engine developed for this invention was designed with small size for fast download as a top priority. As a result, the small download presents no barrier to even standard dial-up telephone modem users. Upgrades to the engine are completely seamless to the user, done automatically during a routine webpage download.

Figure 3:
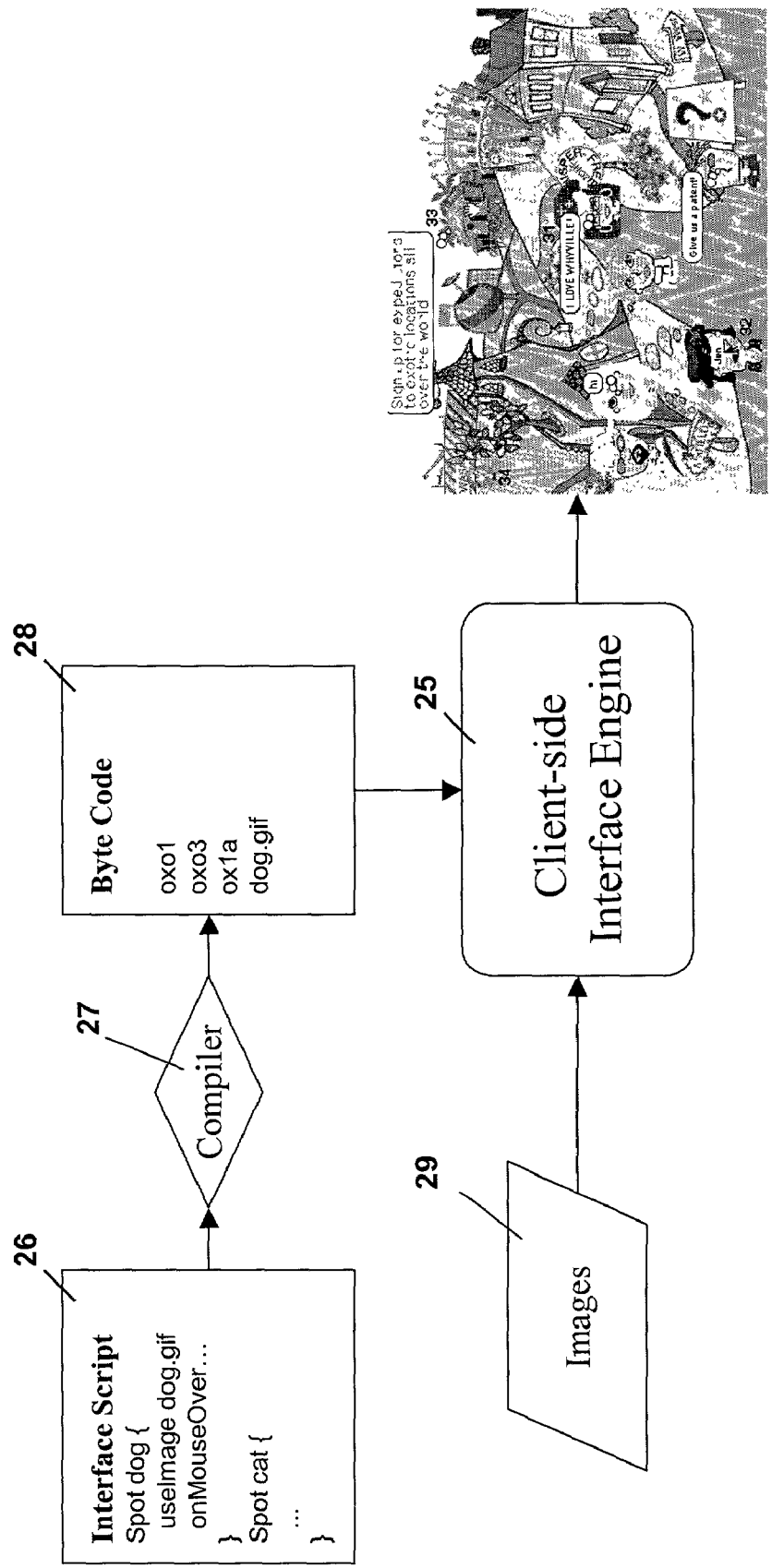
FIG. 3 is a diagram depicting the system of the present invention that supports the run-time client-side user interface.
Figure 4:
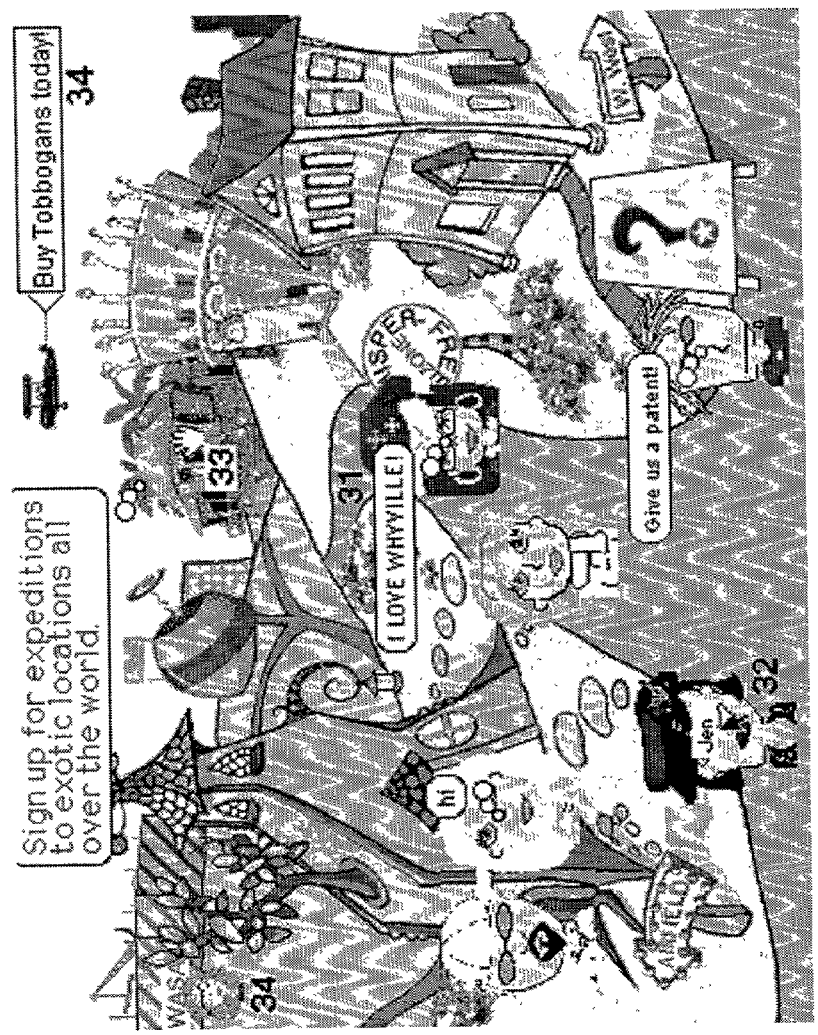
FIG. 4 is a screen shot showing an example of a VR scene generated using the invention illustrating the general graphical user interface.

FIG. 3 describes the user interface system that supports the run-time client-side 16 user interface. A scripting language was conceived specifically for this invention. First, a program script 26 in this language is written in a text editor to define the functions of a given chat room. The interface script 26 is compiled in compiler 27. The command set of this protocol can be broken into four main groups. The first set of commands implement expression handling, so that one can set and mathematically manipulate variables. The second set perform manipulations of on-screen elements, such as images 29, bubble notes, text areas, and geometric elements. The third set control interaction with the web server, making requests and dumping the responses into corresponding variables. The fourth set allows one to turn any web page into a chat room. References are made in the script to the images relevant to this chat room, such as background images and animations.

The script is compiled into a very compact byte-code representation 28, which is then inserted into the text of a web page. On the client side, the browser requests the images specified in the web page, the interface engine 25 interprets the byte-code, integrates the images, and outputs a chat room with the specified capabilities.

FIG. 4 is a scene illustrating the general user interface supported by this invention. Upon signing on to a VR community supported by this system, members are represented in each scene/room of the town by their own unique faces designed by the users themselves. To move around within the scene, the user clicks where he wishes to go, and his avatar head will slide to that location. To speak, the user types on his computer keyboard, and his words appear inside a bubble emanating from his face 31. To find out the name of another person in the Square, the user holds his mouse over the person's face 32, and the username of this person appears. To perform specific actions on another person, the user double-clicks the person's face for a drop-down menu of choices. To find out about buildings and locations visible in the Square, the user holds his mouse over the building/area 33 to elicit a bubble note containing descriptions or instructions. To go inside a building or another location, the user clicks his mouse while these information bubble notes are visible. The user's avatar will slide over to the location, and the scene will change to that of the next destination. Perception of depth within a scene is achieved using an algorithm that shrinks the size of the avatar heads according to its vertical position in the scene 34.

Figure 5:
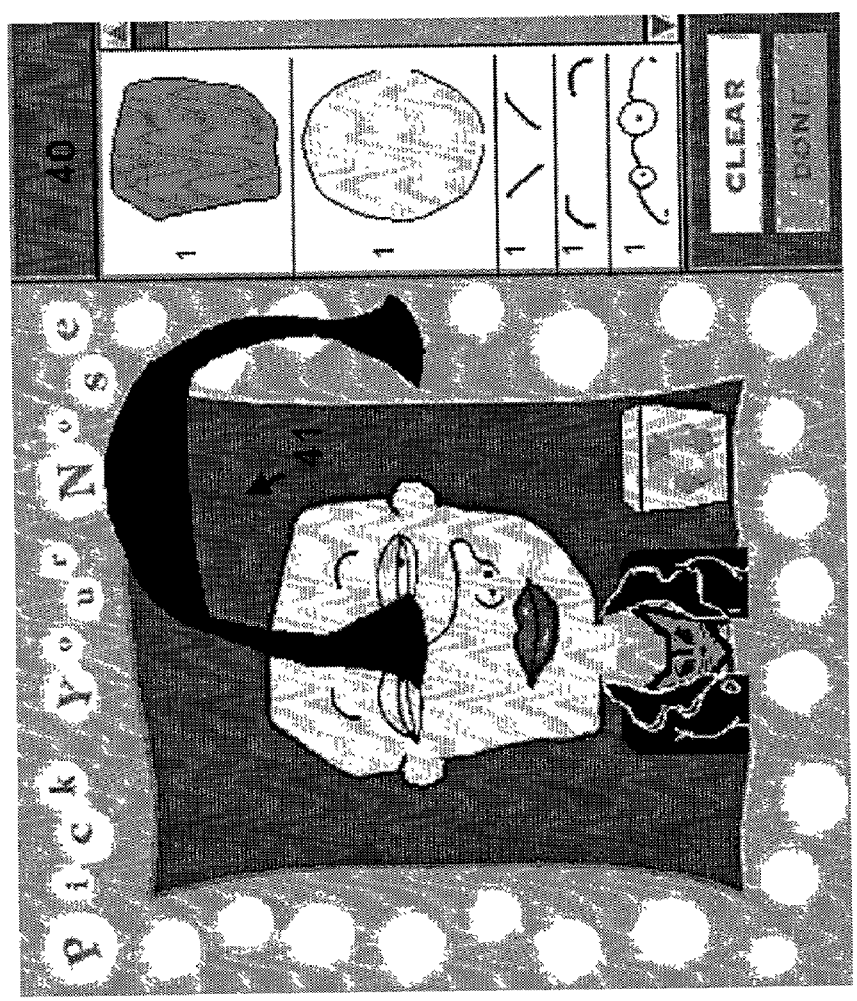
FIG. 5 is a screen shot depicting a tool for avatar creation allowing each user to create a unique identity.

FIGS. 5 and 6 show the tools supported by this invention that allow users to create personal and persistent identities for themselves. The creation and development of a unique identity for each participant is fundamental to the concept of any community, VR or otherwise. Upon first joining this VR community, the participant registers as a member by choosing a user name for him/herself. This name generally has no bearing to the person's real name. Subsequently, this system provides three main avenues for the user to flesh out this virtual identity. The first is avatar design. The user creates his own face using a tool that allows him to pick face parts out of his inventory 40 and place it on his face as he sees fit 41. Upon saving, this face will represent the user wherever he goes within the community.

The second method for identity creation is by establishing a home address. As shown in FIGS. 6A and 6B the system supports a residential area where citizens build their own homes. Each of these buildings 45 is a home built by a citizen and has a geographical location within the suburb, represented by a street address 46. Each house can contain multiple rooms, each of which can have an interior and serve as a chat room. The owner of each house can furnish and decorate the interior 47 and have other users over as guests.

The third method supplied by the system to support identity development is persistent ownership. The user can persistently own each of the aforementioned objects (the parts of his face, the bricks in his house, the furniture in his rooms) among others. The user is free to use his possessions, or to trade, sell, give, or donate them. The perception of persistent identity is reinforced through such ownership.

Figure 7:
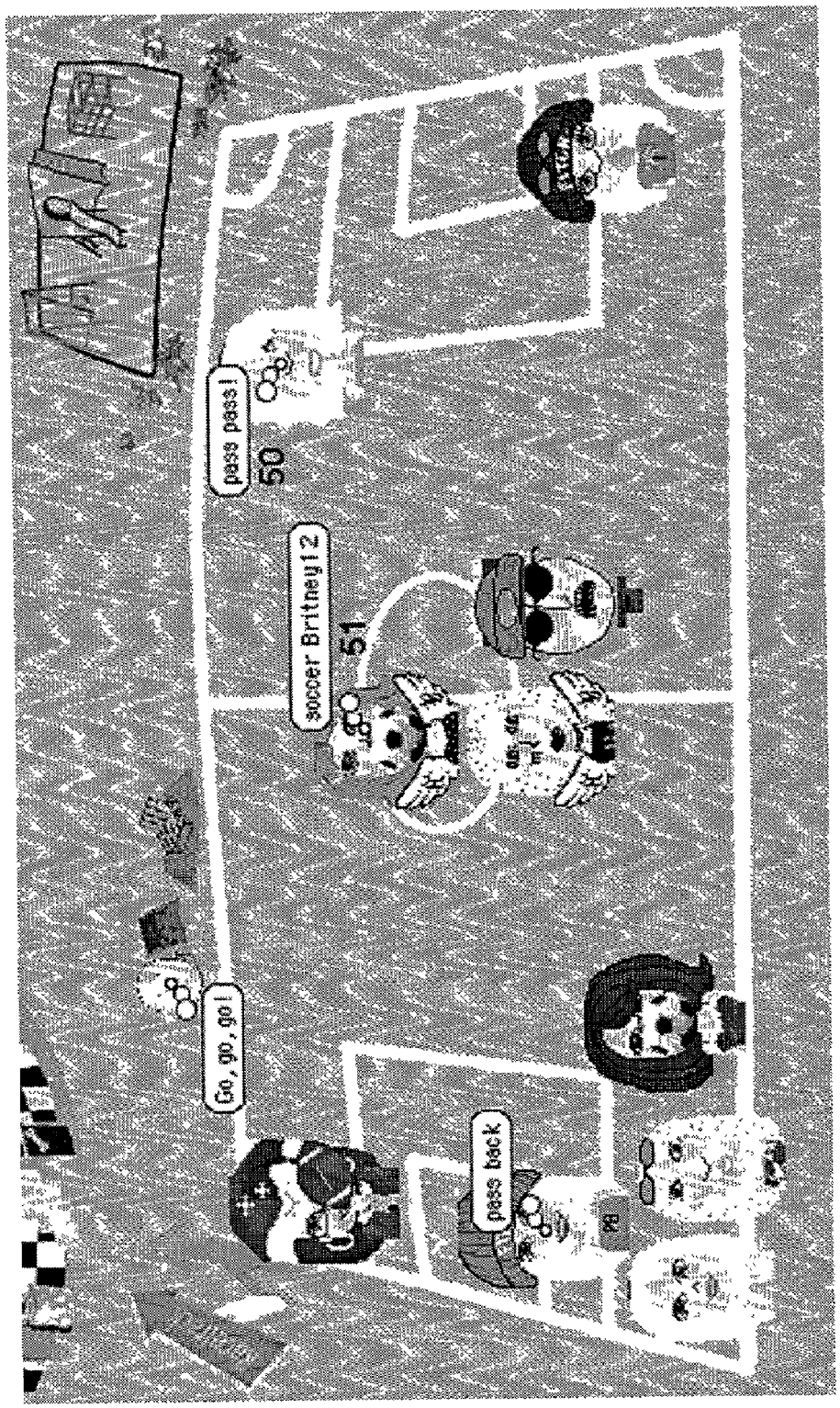
FIG. 7 is a scene illustrating the graphical interaction between users in a VR generated using this invention.

FIGS. 7 and 8 illustrate the methods by which the users interact with each other and with pre-defined characters of the VR. Users of this system interact with each other both synchronously (real-time) and asynchronously. Synchronous interaction is possible for users within the same scene or room. They can chat using graphical chat bubbles 50 simply by typing onto their computer keyboard. In particular, this invention supports two unique types of user interaction: projectile throwing and avatar dancing. Users can throw objects to one another 51 by invoking the name of the object and the name of the target person ("football Jen"). These objects include single-use items such as kisses, smiles, snowballs, and water balloons, as well as objects that can be thrown, caught, then thrown again, such as footballs, soccer balls, and Frisbees. In order to throw an item, the user must first own this item. Avatar dancing is another way users interact. By invoking the name of a dance existing in the database ("dance waltz"), the user's avatar head will go into dance mode and trace out the movements of the dance repeatedly until the user stops himself by saying "stop dance".

This system also supports interaction between users and automated characters. Automated characters dispense instructions and information via chat bubbles 52. They are able to adapt the nature of the information to the identity of the user. An additional module can be added to the basic server to allow the automated character to listen for keywords in the user's speech and adapt behavior accordingly 53. Verbal invocation of events and graphical actions, as illustrated in these examples, is a fundamental user-interface methodology of this invention.

Users also interact and communicate asynchronously with each other. This system supports a suite of asynchronous interaction tools: mail, bulletin boards, and community newspaper. The mail, distinct from a typical email system, is internal to the community and includes a block feature that allows users to selectively block mail from other users. The bulletin boards are based upon proprietary code that includes a filtering function. The user can choose to use a standard set of blacklisted words or even create his personal list. The community newspaper includes a submission tool that allows users to submit their articles on line as well as preview their submitted article in its final format.

FIG. 9 depicts the user interface for one of the multiple tools supported by this system that allow the user to create unique, persistent objects. Users create objects using interactive Java applets that interface with the backend database. Upon completion, these creations are captured as images if they are graphical or defined by a set of parameters and stored inside the database. In some cases, images generated by the users are rendered into GIF images and stored directly on the server. One such tool is a free-draw tool, which is flexibly designed to adapt to the needs of creating different types of products. The tool's basic functions include draw, erase, zoom, and move. The user picks from a 216-color palette and 4 pen sizes. When the tool is used for the creation of face parts, for example, the preview allows the user to try the newly created face part on his own face.

Other creation tools include a graphing tool that allows users to graph points, lines, and curves, a dance creation tool that allows users to define unique dances using vectors, and a 3-D building tool that allows the user to build a house brick by brick. Free-form creation and persistent storage characterize these tools.

Figure 10:
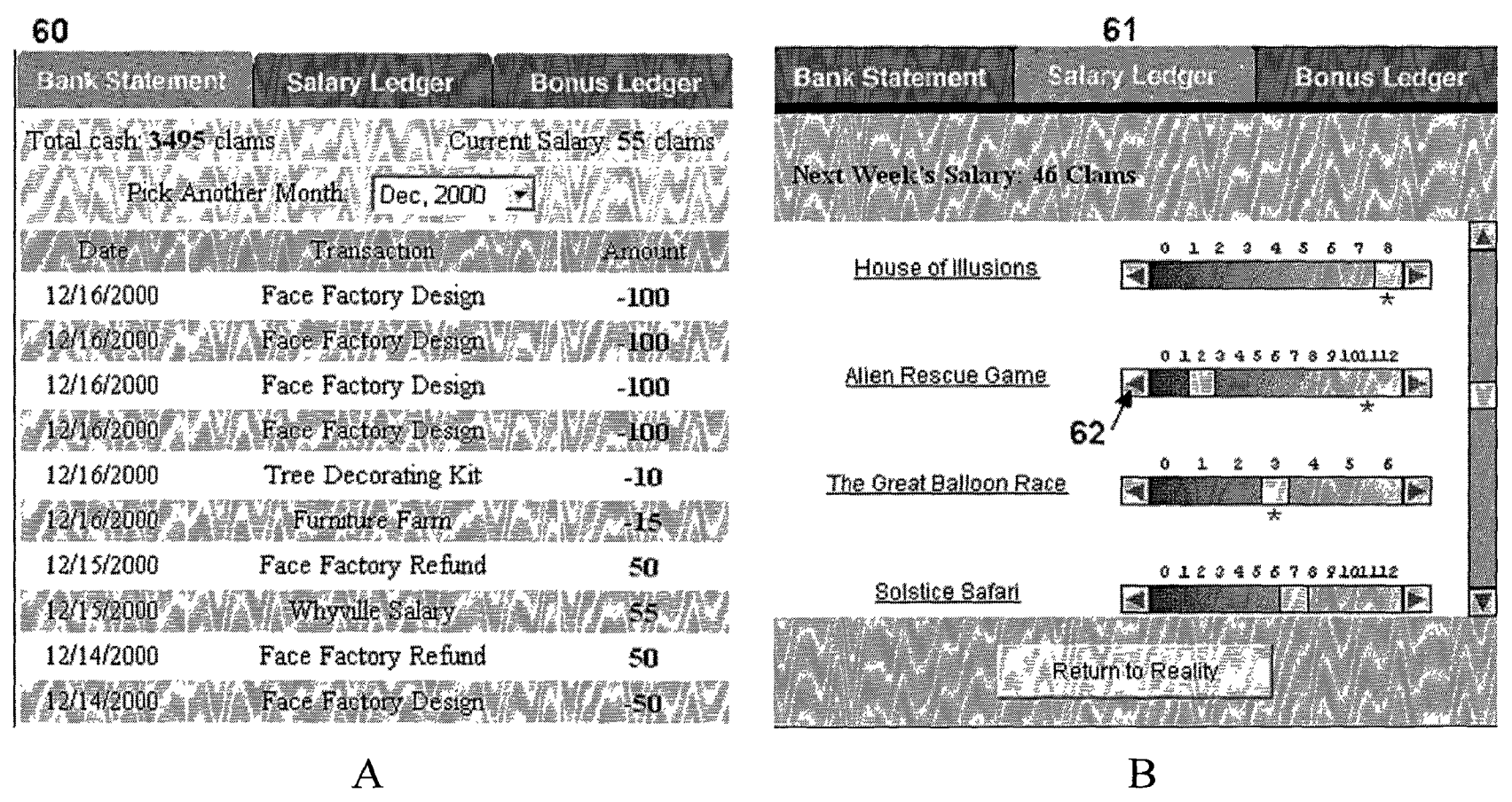

FIG. 10 shows one of the tools in this system for supporting a virtual economy. A database infrastructure supports and keeps track of wealth and product prices, as well as businesses and stock prices. Proprietary code was developed to handle backend transactions invisible to the user, such as salary calculation, salary dispensation, and secure account credits and deductions.

The system also includes a suite of user tools for participating in the economy. Each user owns a ledger that helps him keep track of his finances. A bank statement page lists all credits and debits 60, and a salary calculation page 61 allows the user to consider "what-if" scenarios for his earnings 62. Tools also allow users to go into business together, owning shares in a company, and voting on decisions that affect the company. The system supports a stock exchange for users to buy and sell stocks of these virtual companies, as well as a methodology for transferring funds between users. There are also advertising tools for promoting a business or company. Users can buy a text ad that is dragged across the sky by a plane 34 or create an advertisement to run in the community newspaper using a free-draw tool.

The system provides two categories of tools for community governance. One category relies upon the community and the other relies upon the administrators of the community.

FIG. 11 illustrates peer governance tools, tools that allow members of the community to proactively censor other members. This includes a filtering tool that filters using a standard list of blacklisted words, as well as a user-created list of blacklisted words. The user can also choose to not use the filter at all 65. This filter can then be applied to the chat environment, the bulletin boards, as well as the internal mail system. The user can also actively censor other users in real time by invoking a warning ("warn badguy") 66. A warned user is marked by a large X over his face 67. Upon being warned three times by different individuals, this user is kicked out of the chat room. A user can also choose not to hear an offending user by invoking a silence ("silence badguy") 68, and he will no longer see what the silenced person is saying during that session in the chat room. A user can also choose to never hear another user again by using a tool that is accessed via his personal community address book.

Aside from peer regulations in chat, this system also supports a system for peer monitoring of trustworthiness, so that users can make informed choices about whom they should engage in business interactions with and whom they should not. Users can rate the trustworthiness of other users, and each person's trust index is available to the community. The system also supports a court system for settling disagreements between users. Each side presents his case to a panel of city council members elected by the community, and the city council makes a decision with respect to fines, awards, and/or compensations.

This system also includes community control measures that rely upon the administrators of the community. A log containing all conversations among users is processed programmatically and conversations containing blacklisted words are extracted. One of these administrative tools is shown in FIGS. 12A & 12B. Administrators scan through this extracted log using a tool 70 that allows them to selectively fine (in virtual currency), mute, or banish users from the community. A piece of duct tape 71 is slapped across the face of muted members, and if they attempt to chat by typing, only a string of m's appears.

This system also facilitates dialog between users and administrators. Users write mail to City Hall using the internal mail system. They report behavioral issues using an alert tool. They also use a system for petition and vote that allows them to have a voice in the development of new features in the community.

Figure 13:
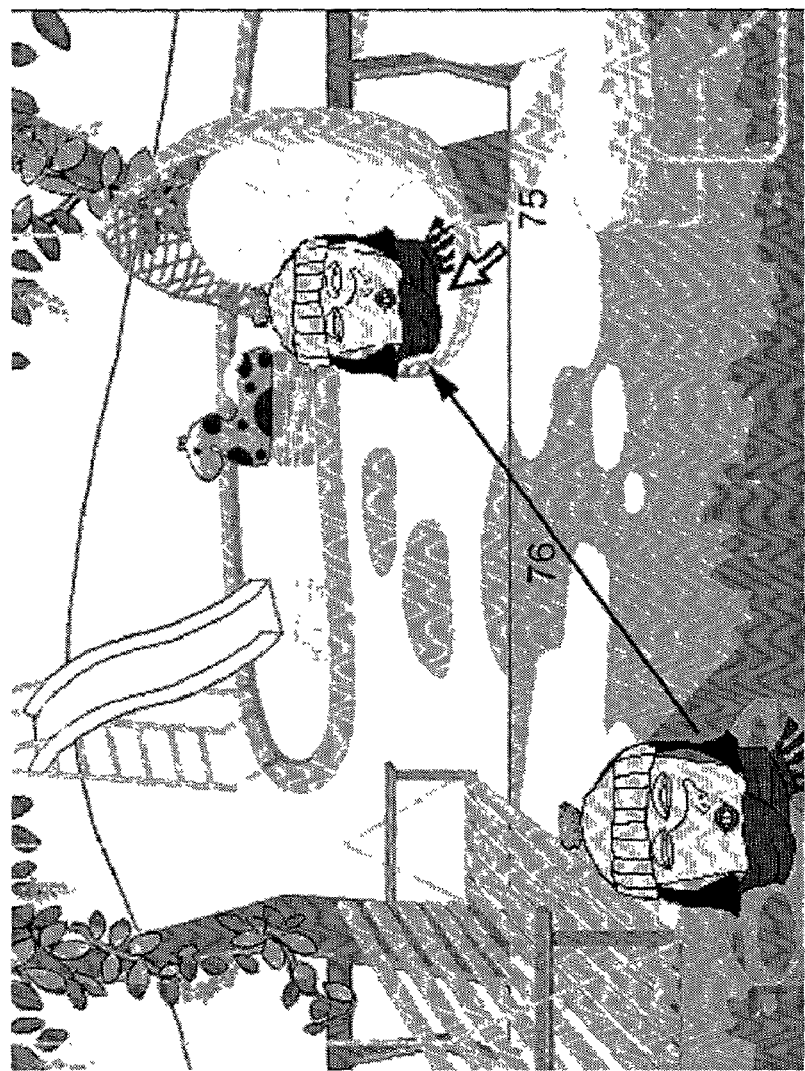
FIG. 13 is a screen shot illustrating the main user-interface method of navigation in this invention, a metaphor for walking.
Figure 14:
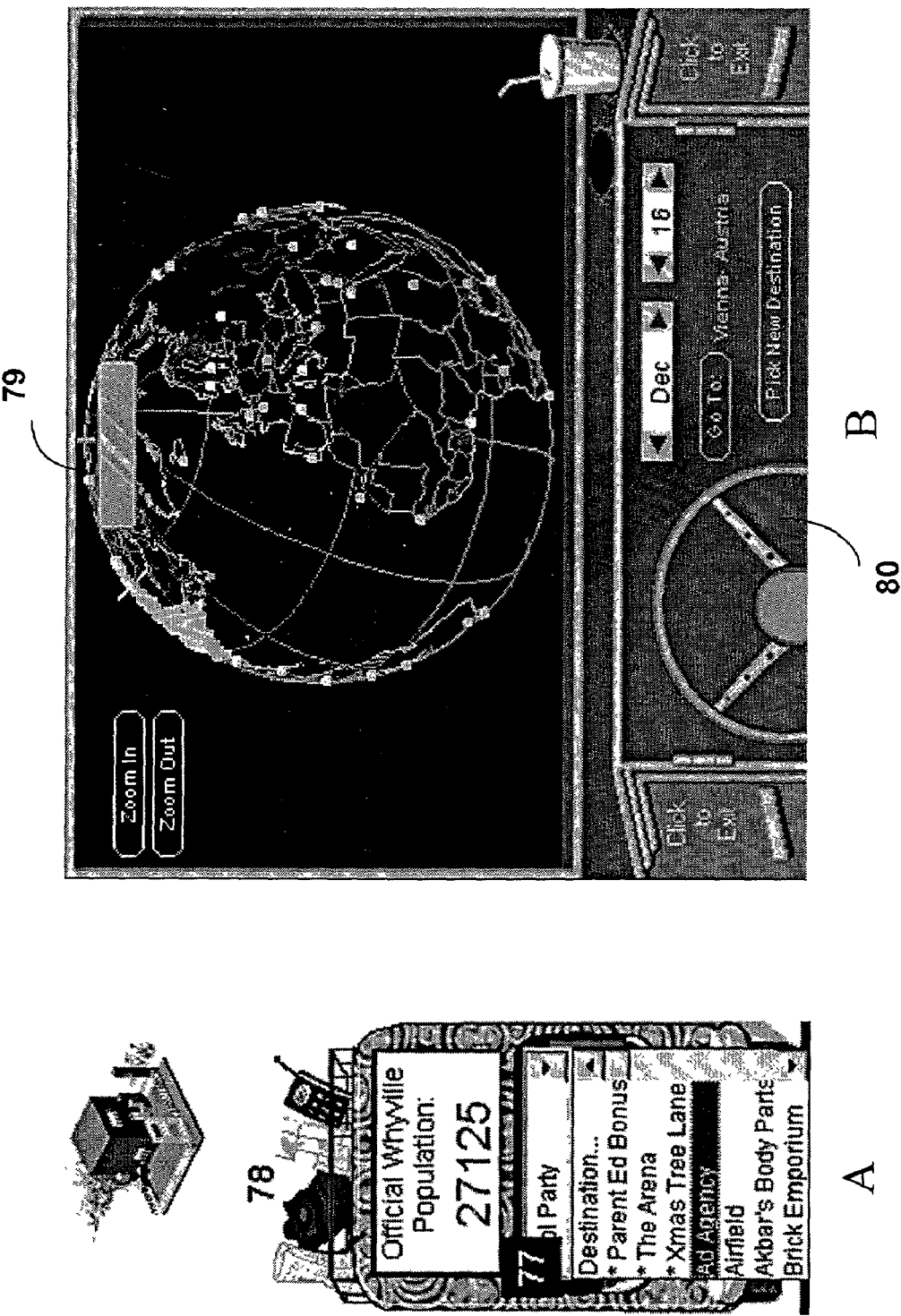
FIGS. 14A & 14B show two screen shots illustrating two other metaphors used for navigation that complement the walking metaphor in this invention.

The navigational methods supported by this system are all necessarily consistent with its overall 3-D theme, as shown in FIGS. 13 and 14. The basic method for users to move around this virtual space is by "walking". This is a third person navigational theme. By clicking anywhere in a scene 75, the user's avatar slides over to this new position 76. If the new position is within a pre-defined hotspot, the scene will automatically change, and the user will have traveled to a new location.

The system also supports other methods of navigation that supplements this one. In order to remain consistent with the 3-D metaphor supported by this system, these other methods also employ real-life, 3-D metaphors, such as a bus. The user is transported to a new location by pulling down the destination menu of the bus 77 and choosing a destination. In order to be consistent with the metaphor, the bus only carries the user to an outdoors scene. The bus is also a useful metaphor for providing convenient access to tools that are perceived as private possessions of the user, such as a satchel, a mail tool, a map, etc. 78. A similar metaphor for transportation is that of a taxi. For moving within a building with multiple floors, the user takes an elevator. The user clicks on the button indicating the floor level and exits the elevator when the door opens to arrive on the desired floor.

Another navigational scheme takes the user out of the immediate vicinity (the town) and transports him to other parts of the virtual world. The metaphor is a time and space machine that travels instantaneously anywhere, anytime. Upon entering this machine, the user sees a globe 79 and panels for date selection 80 on the dash. He can zoom in and view the globe in more detail. Upon deciding on a destination by clicking on the globe and choosing a time, he arrives at the destination, which is yet another scene in this virtual world.

This invention also provides a suite of administration tools needed for maintaining a complex virtual community. FIG. 15 depicts the interface for one of these tools. These tools interface with each of the tables within the database that stores each and every piece of information related to each user as well as general information about the community, allowing administrators with no programming experience to view, update, and manipulate 85 these tables. These include tools for retrieving user registration information, updating user status such as fines, mute days, and banishment, approving user-generated objects for inclusion into the community, and updating the database with new elements of the community, such as new locations, new buildings, and new bulletin boards.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method in which a plurality of members interacts within an immersive online community having avatar virtual objects, said method comprising the steps of:
   interconnecting multiple computers using telecommunications mechanisms optimized for low band width connections;
   compiling a script into a compact byte-code representation optimized for low bandwidth clients that is inserted into the text of a webpage enabling low bandwidth clients to interact with the immersive virtual world;
   enabling an interface engine on a client-side corresponding to each client to interpret the byte-code representation;
   defining functions for a chat room that corresponds to the webpage with the interface engine on the client-side, wherein the interface engine associated with each client is communicatively coupled to a chat server that is on a server-side;
   providing a set of user tools including identity tools that allows users of each client computer to select a set of characteristics to represent avatar objects wherein each of said characteristics is associated with a unique personality specified by the user and represents the user in the online community;
   providing a set of interface tools that are configured to support having said avatar objects interact with each other so that said avatar objects receive real-time responses to stimuli initiated by other avatar objects, said set of interface tools comprising the interface engine;
   downloading the interface engine that supports low bandwidth connections to each client, wherein the interface engine is configured as a Java applet that is cached within a Java enabled web browser;
   navigating said avatar objects on each client within the confines of the immersive online community by receiving dynamically generated content;
   enabling a peer governance tool that includes,
      allowing a member to censor other members with a user created list of blacklisted words that are used in the chat room; and
   enabling an administrator to identify chat conversations that have at least one blacklisted word or phrase to establish community control measures when the members communicate with one another in the immersive online community.

2. The method of claim 1 wherein the navigation is metaphorically correct representation of a three dimensional world.

3. The method of claim 1 wherein the response to stimuli includes said users sending projectiles between at least one avatar object and another avatar object.

4. The method of claim 1 wherein the response to stimuli further comprises a user interacting with a 3-D metaphor.

5. The method of claim 1 wherein the response to stimuli includes a user playing games with other avatar objects.

6. The method of claim 1 wherein said users create objects using interactive Java tools to interact within the immersive online community.

7. The method of claim 1 wherein a user employs verbal invocations that lead to actions selected from the group consisting of projectile throwing, dancing and game playing.

8. The method of claim 1 wherein a user participates in the economy on the immersive online community via use of an economy tool.

9. The method of claim 1 wherein the administrative controls provide governance and logging to user actions with the immersive online community.

10. The method of claim 1 wherein the user interacting in the chat room communicates using a graphical chat bubble.

11. A computer system contained within a computer network comprising:
   multiple computers connected together using telecommunications mechanisms that support low band width connections;
   a script that is compiled into a compact byte-code representation that is optimized for low bandwidth clients and is inserted into the text of a webpage, enabling low bandwidth clients to interact with an immersive virtual world;
   an interface engine corresponding to each client that interprets the byte-code representation on a client side;
   a chat server that is on a server-side, in which the chat server is communicatively coupled to the interface engine on the client-side;
   a chat room that corresponds to the webpage, wherein the functions of the chat room corresponding to the chat server are defined by the interface engine on the client-side;
   a plurality of users using said multiple computers to communicate with each other by way of a plurality of avatars;
   a set of user tools including identity tools for use by said users to select a set of characteristics to represent an avatar object wherein each of said characteristics is associated with a unique personality specified by a user and represents the user in the online community;
   a set of interface tools for use by said users to cause said avatar objects to interact with one other avatar objects such that said other avatar objects receive real-time responses to stimuli initiated by said avatar objects and to cause said avatar objects interactively to pass user generated content between said other avatar objects and said user under administrative controls;
   at least one client configured to employ the set of interface tools, wherein the set of interface tools further comprises the interface engine that is downloaded to each client, wherein the interface engine is configured as a Java applet that is cached within a Java enabled web browser;
   a peer governance tool that includes,
      allowing a member to censor other members with a user created list of blacklisted words that are used in the chat room; and
   an administrator tool configured to identify chat conversations that have at least one blacklisted word or phrase to establish community control measures when the members communicate with one another in the immersive online community.

12. The system of claim 11 which further includes means for the users to control navigation of said avatar objects within the confines of the immersive online community.

13. The system of claim 12 wherein said navigation is metaphorically correct representation of a three dimensional world.

14. The system of claim 11 which further includes Interactive Java tools for use by the users for creating objects to interact within the immersive online community.

15. The system of claim 11 wherein the user employs verbal invocations that leads to actions selected from the group consisting of projectile throwing, dancing and game playing.

16. The system of claim 11 which further includes an interface engine residing within a Java environment, the interface engine updating dynamically using Java standard class libraries.

17. The system of claim 11 wherein the user interacting in the chat room communicates using a graphical chat bubble.

* * * * *